(12) United States Patent
Lang

(10) Patent No.: US 6,912,869 B2
(45) Date of Patent: Jul. 5, 2005

(54) HELICAL IMPINGEMENT COOLING AND HEATING

(75) Inventor: Gary Dee Lang, Naperville, IL (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/453,285

(22) Filed: Jun. 3, 2003

(65) Prior Publication Data

US 2004/0244400 A1 Dec. 9, 2004

(51) Int. Cl.[7] .................. F25D 25/00; F25D 25/02; F25D 25/04
(52) U.S. Cl. .................. 62/378; 62/380; 62/381
(58) Field of Search .................. 62/62, 63, 380, 62/381, 378; 99/352, 386, 443 C; 198/778

(56) References Cited

U.S. PATENT DOCUMENTS

| | | | |
|---|---|---|---|
| 4,741,430 A | * 5/1988 | Roinestad | 198/778 |
| 4,750,276 A | * 6/1988 | Smith et al. | 34/612 |
| 4,866,946 A | * 9/1989 | Klee | 62/63 |
| 4,875,343 A | 10/1989 | Jeppsson | 62/381 |
| 4,947,654 A | * 8/1990 | Sink et al. | 62/380 |
| 4,953,365 A | 9/1990 | Lang et al. | 62/381 |
| 5,020,330 A | * 6/1991 | Rhoades et al. | 62/381 |
| 5,189,948 A | 3/1993 | Liebermann | 99/443 |
| 5,203,820 A | * 4/1993 | Dibbs | 62/381 |
| 5,205,135 A | 4/1993 | Lang | 62/381 |
| 5,222,309 A | 6/1993 | Ross | 34/155 |
| 5,408,921 A | 4/1995 | Persson et al. | 99/443 |
| 5,452,588 A | * 9/1995 | Onodera | 62/381 |
| 5,551,251 A | 9/1996 | Ochs et al. | 62/380 |
| 5,740,678 A | 4/1998 | Lee et al. | 62/63 |
| 6,009,719 A | * 1/2000 | Ochs | 62/380 |
| 6,263,680 B1 | 7/2001 | Newman et al. | 62/63 |
| 6,334,330 B2 | * 1/2002 | Lang et al. | 62/380 |
| 6,418,834 B1 | * 7/2002 | Perrine | 62/380 |
| 6,629,493 B1 | * 10/2003 | Schaible et al. | 99/352 |

* cited by examiner

*Primary Examiner*—Denise L. Esquivel
*Assistant Examiner*—Richard L. Leung
(74) *Attorney, Agent, or Firm*—Donald T. Black

(57) ABSTRACT

A unit for cooling or heating objects on a helical belt includes between adjacent tiers of the belt a distributor having a plurality of slots through which air or other gaseous heat transfer medium can be impelled onto product passing on the belt below the slots.

32 Claims, 5 Drawing Sheets

HELICAL IMPINGEMENT COOLING AND HEATING

FIELD OF THE INVENTION

The present invention relates-Lo devices useful for effecting rapid heat transfer to or from objects, such as the cooling and/or freezing or the heating and/or cooking of food.

BACKGROUND OF THE INVENTION

Many industries, not least among them the food industry, find it necessary in the course of their operations to be able to cool or heat products relatively rapidly.

When a product needing chilling or freezing is at room temperature, or is at temperatures higher than room temperature as the result of a previous processing or cooking step, reducing the temperature of the product rapidly is desirable in order to minimize the ability of pathological organisms such as bacteria to grow on or in a product, and (particularly when the product is to be frozen), to put the product into condition to be packaged prior to its being stored and/or shipped to distributors or customers. Examples of products which benefit from this treatment, which are also products that can be treated by the present invention, include raw foods such as eggs, hamburger patties, fruits and vegetables, raw or cooked cuts of meat such as beef, pork, veal, lamb, poultry carcasses and poultry sections, as well as processed foods prepared by combining various ingredients, such as pastries, pre-packaged entrees and complete dinners.

When a product is to be heated or cooked, the ability to achieve the necessary heat transfer rapidly is useful in order to minimize the opportunity for pathogens to grow, and to achieve a greater rate of processing in a given period of time.

Many techniques are known for cooling and freezing large numbers of food products. Examples include impingement coolers, mechanical refrigerators, and other devices wherein the product is conveyed through a chamber wherein the product is exposed to low temperatures for a sufficient period of time to reduce the temperature of the product to the desired final, cooled temperature.

Many techniques are also known for heating and cooking large numbers of food products, such as tunnel ovens and the like.

One preferred type of device applicable to cooling/freezing and heating/cooking applications is known as a spiral or helical cooler or cooker, wherein at least a portion of the path that the product follows as it is conveyed through a chamber is in the form of a helix. For example, the product is placed on a moving flexible belt that follows a path which curves around on itself as it steadily climbs. With this type of device, the product travels a longer distance and experiences a longer dwell time in the cooling or heating environment for a given amount of area occupied by the device, taking advantage of the vertical array of the belt.

Helical (or spiral) devices have heretofore presented a drawback that the successive tiers of the belt interfere with heat transfer from or to the product, because of the proximity of adjacent tiers which interfere with flow of cooling or heating air and which are also carrying product that as a heat sink or source, as the case may be Thus, there remains a need for devices and methods that retain the advantages of helical devices but which achieve faster heat transfer to or from the product than has been available up to now.

BRIEF SUMMARY OF THE INVENTION

One aspect of the invention is a device useful for effecting heat transfer between objects and a gaseous heat transfer medium, comprising (A) an insulated housing;

(B) an endless movable belt for carrying objects, that follows within said housing a path at least a portion of which is helical that defines a space bounded above and below by said belt and through which a gaseous heat transfer medium can flow toward or away from the axis of the helical path;

(C) structure for supporting said belt and permitting it to move in said path, (D) means for driving said belt in said path;

(E) a source that provides gaseous heat transfer medium at a temperature higher or lower than the temperature of said objects;

(F) a distributor plate located within said space having at least one slot therein extending transverse to the direction of motion of said belt, the slot having a mouth for receiving said heat transfer medium and a discharging orifice for discharging said heat transfer medium toward a surface of the belt under the influence of impeller (G), (G) an impeller for circulating said heat transfer medium, and (H) structure defining a pathway for said heat transfer medium to flow under the influence of impeller (G) from said source into said space, through said at least one slot toward a surface of the belt, and then out of said space.

In a preferred embodiment, there are provided (F1) a first distributor located within said-space having at least one slot therein extending transverse to the direction of motion of said belt, the slot having a mouth for receiving said heat transfer medium and a discharging orifice for discharging said heat transfer medium under the influence of impeller (G) toward a surface of the belt above said discharge orifice, and (F2) a second distributor located within said space having at least one slot therein extending transverse to the direction of motion of said belt, the slot having a mouth for receiving said heat transfer medium and a discharging orifice for discharging said heat transfer medium under the influence of impeller (G) toward a surface of the belt below said discharge orifice, there being a region in said space between said first and second distributors, and the structure (H) defines a pathway for said heat transfer medium to flow under the influence of impeller (G) into said region, through said at least one slot in said first and second distributors toward surfaces of the belt above and below said distributors, and then out of said space.

As used herein, "cooling" and its conjugate forms means removing heat from an article, and thus encompasses reducing the temperature of the article, freezing the article, or both reducing the temperature and freezing.

As used herein, "heating" and its conjugate forms means adding heat to an article, and thus encompasses increasing the temperature of the article, cooking the article, or both increasing the temperature and cooking.

DETAILED DESCRIPTION OF THE INVENTION

Figure 1:
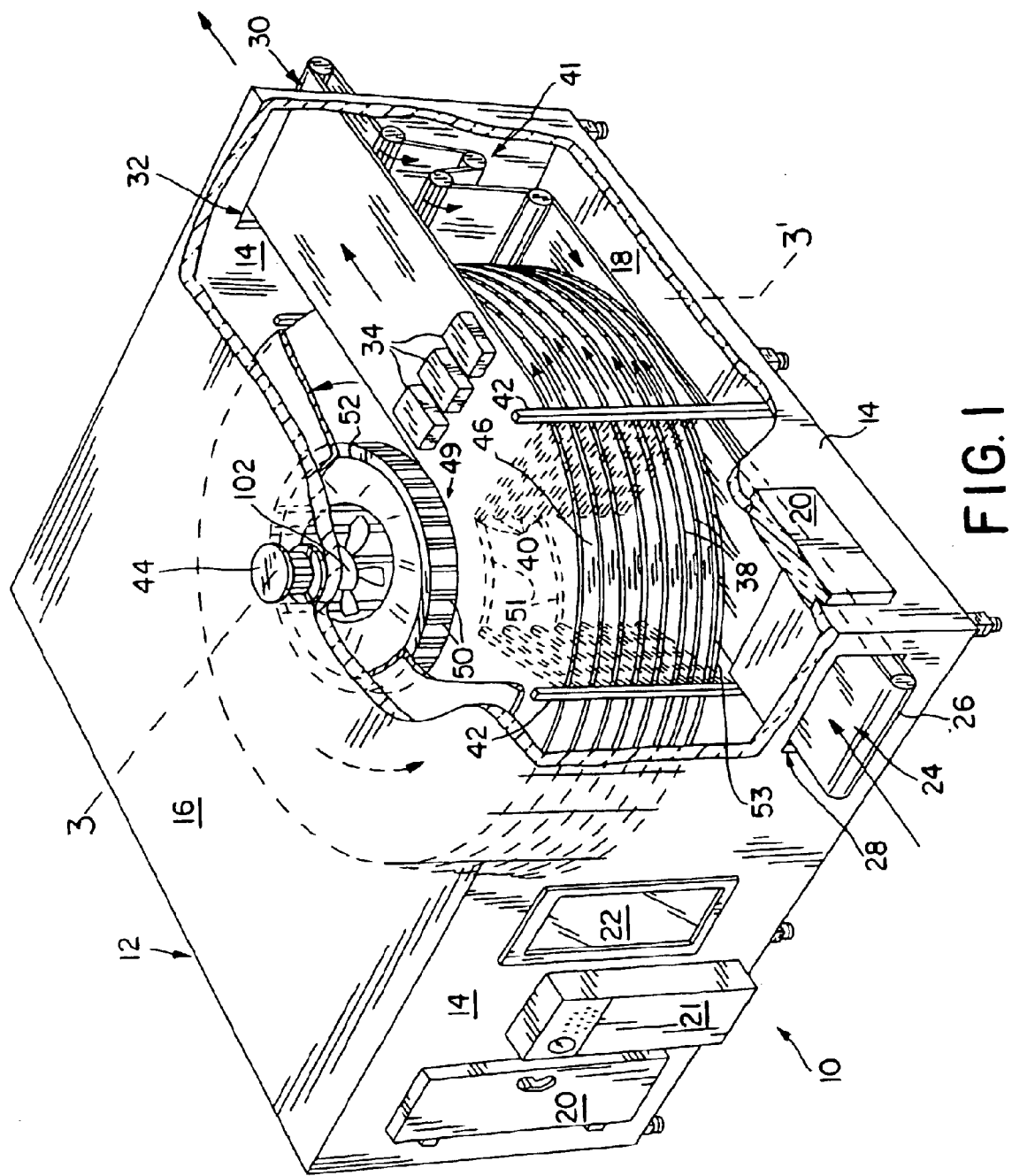
FIG. 1 is a perspective view in partial cutaway of a device with which the present invention is useful.

One embodiment of the type of device with which the present invention is useful appears in the drawing figures. However, these illustrations are provided for purposes of description and are not intended to limit the definition of this invention.

The device generally comprises unit 10 comprising an insulated housing 12, and means for carrying products through housing 12. The device also comprises structure and components, not shown in FIG. 1, for cooling or heating the products as they pass through the housing 12.

Housing 12 can take the form of a rectangular parallelepiped having four vertical walls 14, a top wall 16, and a bottom 18, all of which are preferably thermally insulated against heat flow therethrough into or out of the interior of housing 12. One or more doors 20, and optional window 22, can be provided to permit physical and visual access to the interior. Control panel 21, containing controls such as for the operation of the belt, any impellers, and the cooling unit, and conveniently also containing gauges for monitoring the conditions of the unit, can also be provided on the exterior of a wall 14.

The products to be cooled or heated are preferably conveyed on an endless belt 24 which can be of known construction. The belt is preferably porous enough to permit air to flow through it. Examples include belts of unitary material such as a polymeric web of material., and belts of interlocked links of polymeric or metallic material which can flex and change their position relative to adjacent links so as to accommodate passing through the straight and curved portions of the belt's route.

Loading (or unloading) station 26 is preferably provided adjacent to an opening 28 through one wall 14, and an unloading (or loading) station 30 outside an opening 32 through the same or another wall 14 is also provided. With these stations and openings, product can be fed into and recovered from the unit 12 without the operator needing to enter the unit. As shown in FIG. 1, one of the openings 28 and 32 is located relatively low, at about the same level as the lower end of the helix formed by the belt, and the other of these openings is at a relatively high level at the upper end of the helix. Product can pass from low to high, as indicated by the arrows in FIG. 1, or from high to low. A small number of articles 34 are shown in FIG. 1, for purposes of illustration, but in actual practice the belt could be carrying a much higher number of articles.

The belt 24 is driven in any known manner by a motor (not shown) or other suitable drive means. A preferred drive means is a cylindrical cage 49 (so called because in one preferred embodiment it comprises a plurality of vertical bars 50 arrayed to form a cylinder and attached to circular ring plates at the top (shown as 52) and the bottom) and located in space 104 within the helix formed by the helical portion of the belt. This cage frictionally engages at its outer surfaces the inner edge of the belt. The cage is rotated about its longitudinal axis via a motor (not shown), and by frictional engagement the rotation of the cage causes the belt to move through its path. A fuller description of this type of drive means appears in U.S. Pat. No. 4,953,365.

The belt 24 shown in FIG. 1 travels into the housing 12 and then upward about a generally helical path thereby defining a plurality of tiers 38 and defining spaces 46 between each pair of adjacent tiers 38. The tiers 38 are supported by a plurality of horizontal arms 40 which extend inward transversely and preferably radially inward from posts 42 that extend between top wall 16 and bottom wall 18. Circumferential support beams (some of which are shown as 51 and 53) are attached to the inner and outer ends, respectively, of the arms 40, and have curvature corresponding to that of the inner and outer edges of the belt so that the inner and outer edges of the belt are supported by and slide on the upper surfaces of supports 51 and 53. Other arrangements for structure that supports the belt and permits it to move are also known and can be employed, so long as they support the belt in the desired path and permit it to move along the path (such as with the aid of rollers or roller bars on the arms 40). A suitable tensioning mechanism can be provided, such as is shown at 41., to help the belt to be sufficiently taut regardless of changes in its length caused by temperature differentials.

Structural components such as panels and baffles (not all of which are shown in FIG. 1, but which can seen in FIGS. 2, 3, 5 and 6) are provided within housing 12 so that gaseous heat transfer medium circulating under the influence of an impeller circulates from the impeller into the spaces 46 where it encounters distributor 202. (which is depicted in one location in FIG. 2), then through the slotting in the distributor 202 toward product on the belt, and then back around to the impeller. Referring to FIGS. 2, 3, 5 and 6, the gaseous heat transfer medium circulates into space 104, then into space 46, downward through distributor 202, and out of space 46 into space 106.

Figure 2:
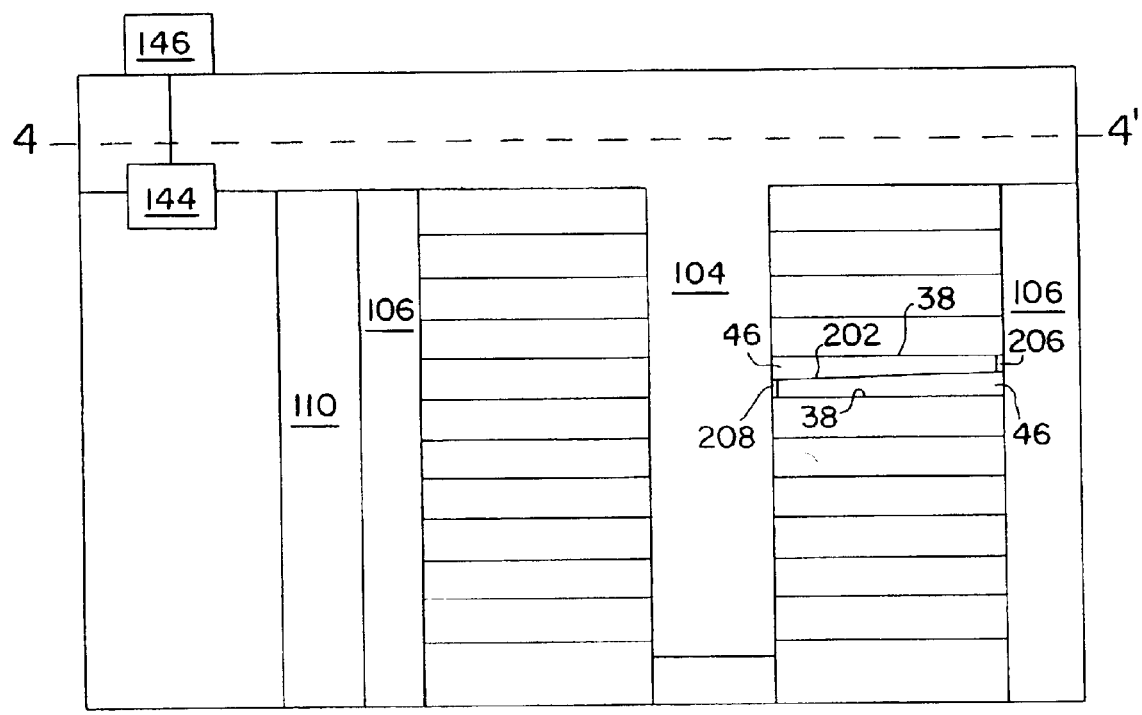
FIG. 2 is a cross-sectional view of an embodiment of the device of FIG. 1.
Figure 4:
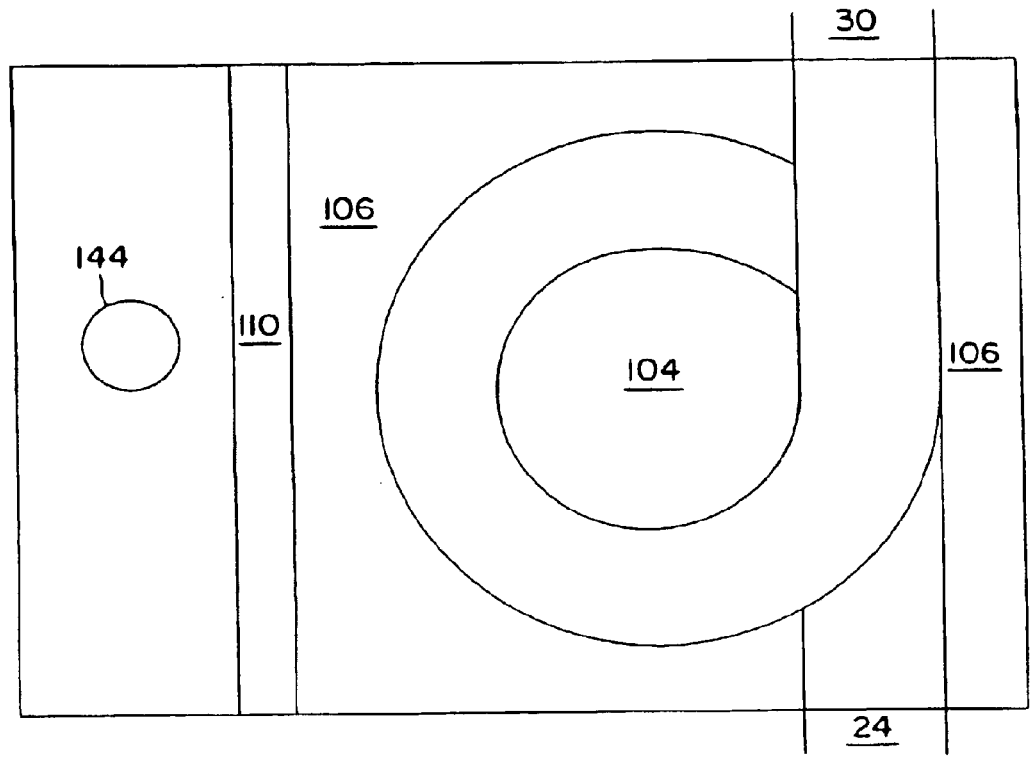
FIG. 4 is a top view of the device of FIG. 2, taken along the line 4–4' appearing in FIG. 2.

Referring to FIG. 4, the flow of air or other heat transfer medium in the unit that is depicted in FIG. 2 is into the page into space 104, then radially outward between and across the belt tiers into space 106, then through cooler 110, up through impeller 144, and over the helix to above space 104.

The gaseous heat transfer medium is often air. For cooling purposes, the invention can be practiced using injected cryogen such as liquid nitrogen or liquid carbon dioxide, as discussed below. For heating purposes, air can be used as the heat transfer medium, as can other heat-carrying substances such as steam. The present invention will be described first with reference to cooling using air.

There are several ways that can be employed to cool air in the practice of the present invention. In the embodiment of the invention shown in FIG. 2, the air within housing 12 is cooled by cooler 110. Impeller 144, driven by motor 146, draws air through cooler 110 and circulates the air.

Cooler 110 comprises any conventional heat exchange device by which cooling fluid, such as air, passes through cooler 110 and is chilled via indirect heat exchange by coming into contact with piping or other surfaces which are colder than the fluid entering into cooler 110. One preferred technique is to contact the air with piping that contains mixed carbon dioxide-ammonia refrigerant, which is generally at $-62°$ F. to $-63°$ F., so that the air is chilled to about $-52°$ F. to $-53°$ F. Another preferred technique is to use as the refrigerant a multicomponent refrigerant such as disclosed in U.S. Pat. No. 6,176,102, which permits the cooling surfaces to have a temperature even as low as about −140° F. so that the air can be chilled to about −125° F.

Figure 3:
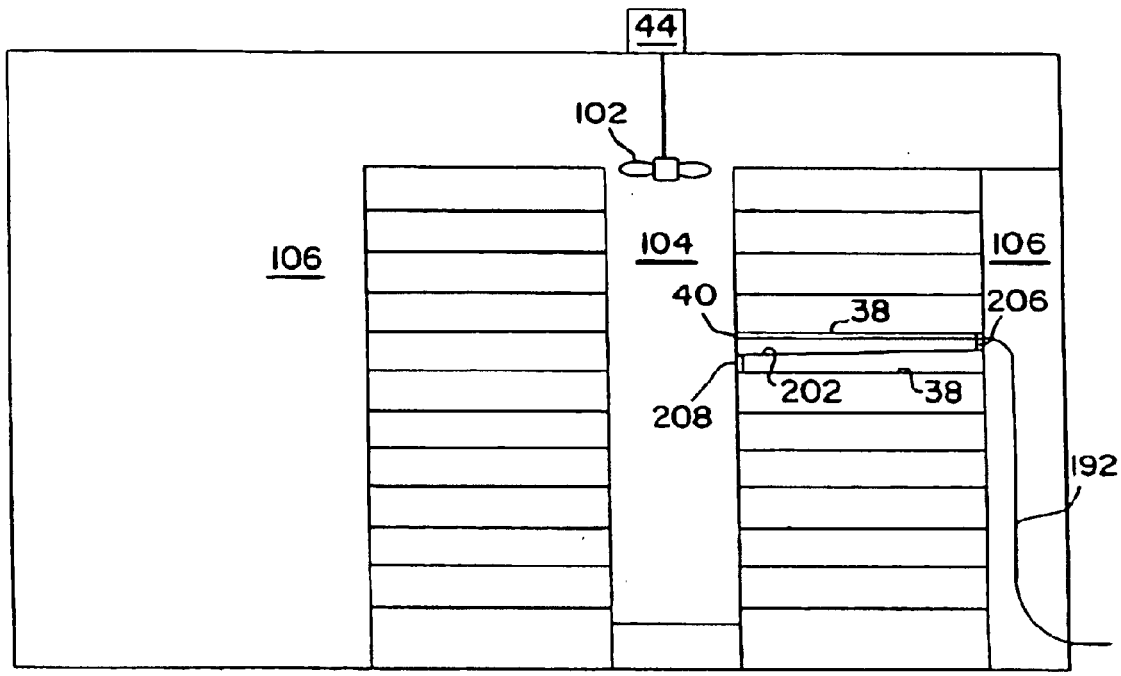
FIG. 3 is a cross-sectional view of an embodiment of the device of FIG. 1, taken along the line 3–3' appearing on FIG. 1.
Figure 6:
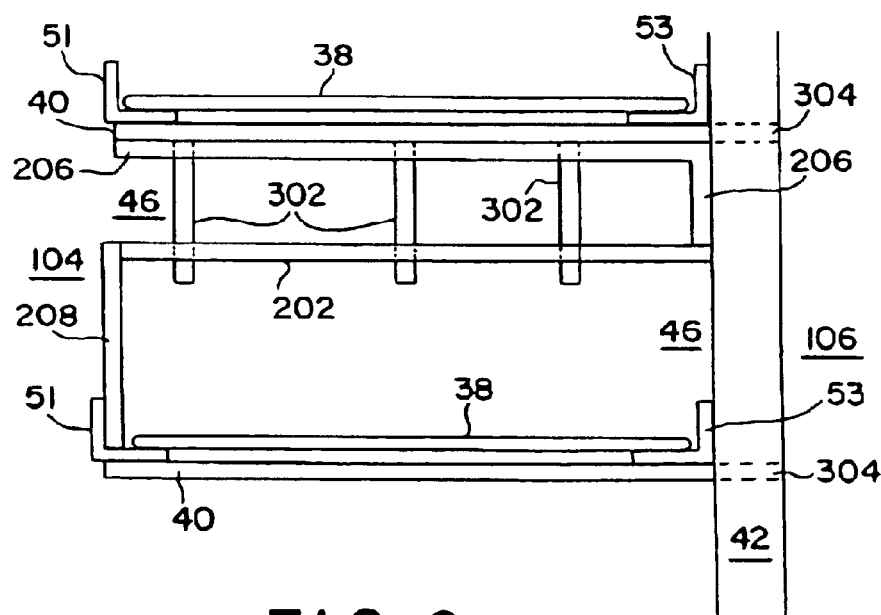

Another technique to provide cooling is to use liquid cryogen such as liquid nitrogen or liquid carbon dioxide, which are of course very cold before and after they evaporate. Referring to FIGS. 3 and 6, liquid cryogen is fed under pressure into the interior of housing 12 via line-192 and is sprayed onto products on belt 38. Vaporization of the injected cryogen withdraws heat and provides a very cold gaseous heat transfer medium. Thus, the embodiment of FIG. 3 does not need cooler 110. An impeller is still necessary, to provide the desired flow of heat transfer medium through the slots in distributor 202, but in embodiments employing cryogen a suitable impeller such as bladed fan 102 is preferably used and should be located closer to the helically arrayed belt. A preferred location is at the top of space 104, as shown in FIG. 3. The impeller 102 is driven by a suitable motor 44 which is preferably mounted atop the top wall of the housing and drives the fan via a suitable drive shaft.

Referring to FIG. 6, in one preferred mode of spraying the cryogen one or more of the arms 40 are hollow and have on the underside a plurality of nozzles 302 which preferably extend through matching holes in distributor 202 toward the belt. Line 192 from outside housing 12 is connected to opening 304 in the end of each arm 40 that is so constructed, and cryogen fed into opening 304 emerges under pressure from nozzles 302 toward and onto the belt. Impeller 102 circulates the cold vapor and impinges the cold vapor through slots 210. Line 192 is connected outside housing 12 to a tank or other suitable source of cryogen under pressure In embodiments in which products on the belt are to be heated, the arrangement in FIG. 2 can be employed in which cooler 110 is replaced by an air heater which is a source of heated air that serves as the heat transfer medium which is circulated and impinged upon the product. Alternatively, the arrangement in FIG. 3 can be employed in which line 192 feeds steam from a source such as a steam generator through opening 304 into arms 40 and out nozzles 302. The thus ejected steam performs as a hot heat transfer medium.

Figure 5:
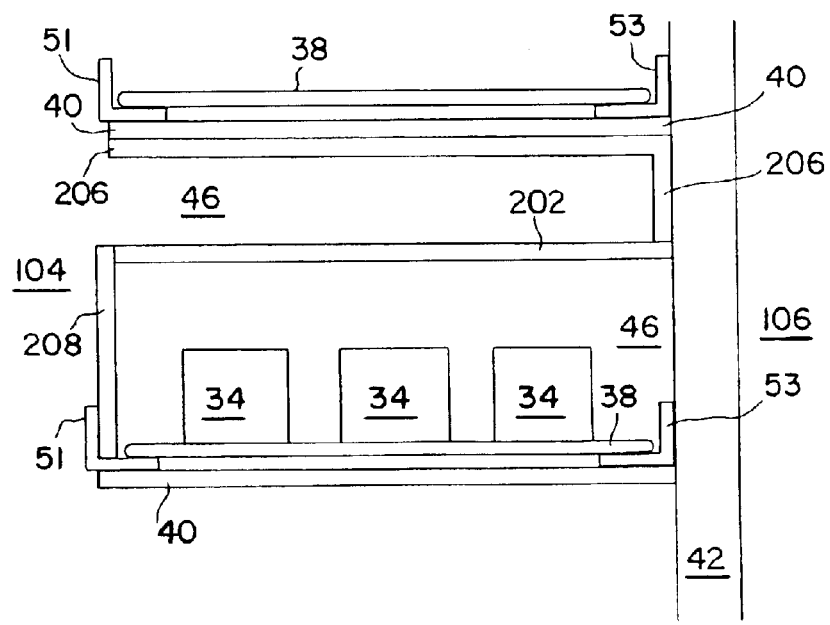
FIGS. 5 and 6 are side views of a portion of the device seen in FIGS. 2 and 3.
Figure 7:
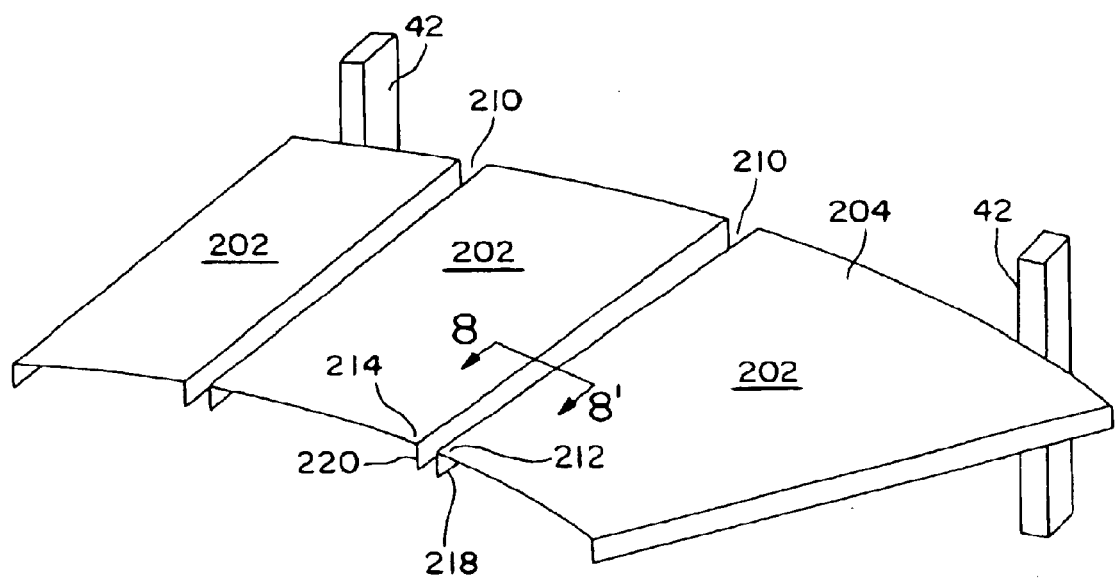
FIG. 7 is a perspective view of a distributor useful in the present invention.

Additional aspects of distributor 202 can be seen in FIGS. 5–8. Referring first to FIGS. 5–7, adjacent tiers 38 of the belt can be seen, as can vertical post 42 and arms 40 which support tiers 38. Distributor 202 is positioned in the space 46 between adjacent tiers 38. The distributor 202 comprises a preferably flat, rigid structure which can be all one piece or can comprise a plurality of separate pieces sequentially adjacent to each other. It is preferably impermeable to air and can be made of metal or plastic. Distributor 202 is attached to posts 42 and extends substantially and preferably completely across the belt; the larger the area of the belt that the distributor extends across, the larger the area of the belt that can receive the impinging flow of cooling air or other heat transfer medium through distributor 202.

Panels 206 and 208 serve as barriers defining a flow path so that the gaseous heat transfer medium entering space 46 is forced to pass through the slots 210 in distributor 202 before the gaseous heat transfer medium leaves space 46, whether passing from space 104 to space 106 or from space 106 to space 104. Panels 206 can be attached to posts 42. Panels 208 can be attached to and depend from the ends of arms 40. Distributor 202 shown in FIG. 5 is positioned to impinge air or other gaseous heat transfer medium onto the top surface of product passing on the belt below the distributor.

It is possible, and preferred, to provide a correspondingly constructed second distributor (not shown) in the upper region of space 46 through which some of the gaseous heat transfer-medium entering space 46 is impelled through slots in the second distributor toward the product on the belt, preferably passing through the belt and actually contacting the product. In this embodiment, panels and baffles should be provided that define for the gaseous heat transfer medium a path such that it enters space 46 between the two distributors, passes upward and downward respectively through slots in the two distributors, impinges toward the belt surfaces above and below the space, and exits space 46 (e.g. from space 104 to space 106 or vice versa).

Figure 8:
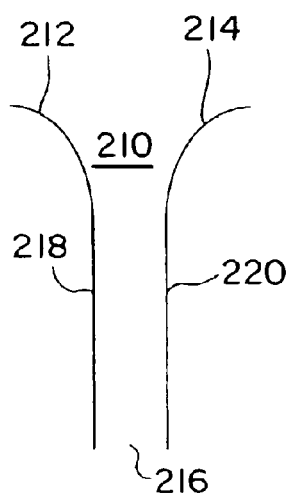
FIG. 8 is a perspective view of a slot in the distributor depicted in FIG. 7, viewed in cross-section taken along the line 8–8' seen in FIG. 7.

Distributor 202 comprises a plurality of slots 210 which are illustrated in FIGS. 7 and 8. The slots extend transversely across the distributor 202, by which is meant that they extend in a direction not parallel to the direction of motion of the belt. Preferably, the slots extend radially, by which is meant perpendicular to the direction of motion of the belt, but the angle of the slots with respect to the direction of motion of the belt can be less than 90 degrees as well. The slots preferably extend fully from one edge of the distributor to the other, to increase the opportunity to impinge gaseous heat transfer medium onto objects on the belt. However, it is also possible to have the slots extend less than the full distance between the edges of the distributor.

Top surface 204 of the distributor 202 can be horizontal (in the direction from edge to edge of the belt) but it can be inclined such that the distance from surface 204 to the belt surface downstream of the slots 210 increases from the edge of distributor 202 that the gaseous heat transfer medium crosses as it enters space 46 to the opposite edge of distributor 202. The distributor should be generally inclined in the direction of incline of the belt.

Adjacent edges of adjacent portions of distributor 202 define slots 210 therebetween through which the gaseous heat transfer medium is impelled toward objects on the belt below the slots.

Referring to FIG. 8, slot 216 includes a mouth between corners 212 and 214. It also includes a discharge orifice 216, through-which the gaseous heat transfer medium passes toward the belt surface. Preferably, the discharge orifice is rectangular in cross section but other configurations are useful that help direct gaseous heat transfer medium toward objects on the belt. The sides 218 and 220 can be parallel or may converge toward each other.

Figure 9:
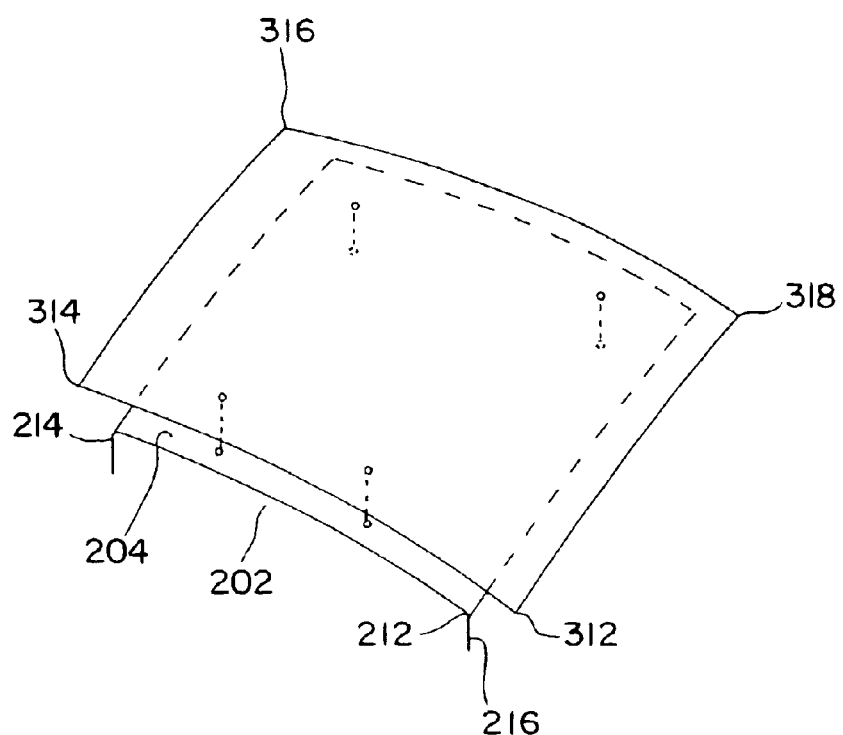
FIG. 9 is a perspective view of another embodiment of a distributor useful in the present invention.

FIG. 9 depicts a convenient way to provide the distributor 202 with associated structure. Distributor 202, having top surface 204, can be seen. At the lateral edges of distributor 202 are corners 212 and 214, which form slots 210 when corresponding structural units are installed on each side of the unit that is depicted in FIG. 9. Plate 300 is also provided which is attached to distributor 202 via a plurality of rods 302 that hold plate 300 apart from surface 204. When this structure is installed, the edge defined between corners 314 and 316 abuts the corresponding edge of an adjacent unit, as does the edge defined between corners 312 and 318.

It is convenient to provide distributor 202 as a series of removable sections, to facilitate cleaning of the device.

The number of slots provided in the distributor, and the spacing between slots, should be designed into the device to accommodate the desired rate of throughput of product, the desired amount and rate of heat transfer (including the temperature of incoming product, the desired temperature of product exiting the device, and whether the product is to be frozen or cooked), the temperature of the heat transfer medium, the volumetric flow rate provided by the impeller, and the size of the unit. Satisfactory results are obtained when the velocity of the heat transfer medium through the slots is 8 to 15 meters per second.

The device of the present invention can be used to cool, freeze, or form a frozen crusted outer surface, on products that are at room temperature or that are cooler or warmer than room temperature, especially including products that have just been cooked or have just been cut from freshly slaughtered animals. It can be used to warm or cook objects that enter at room temperature or at temperatures higher or lower than room temperature, especially including products that are fresh or have been stored in chilled or frozen conditions.

The device of the present invention affords numerous advantages. The principal advantage is a much higher rate of heat transfer from the product. This advantage leads to several other advantages: for a given size of device, more product can be cooled or heated, and/or product can be cooled (or heated) to a lower (or higher) temperature; a given amount of cooling or heating can be achieved in a much shorter period of time; and a given amount of product can be cooled or heated more quickly in a smaller unit than heretofore needed.

In particular, when this invention is used to freeze at least the outer surface of a product, the product retains a greater proportion of its internal moisture compared to freezing using previously known devices, because other freezing regimens permit a greater amount of that moisture to be lost from the product before a frozen outer layer forms that prevents further moisture loss. The more rapid cooling and freezing and this invention provides establishes that frozen outer layer much more quickly, thereby retaining more of the internal moisture. This advantage is especially useful when the product being treated is warm and/or moist, such as freshly produced raw-meat, freshly cooked meat, and freshly steamed or cooked vegetables.

EXAMPLE

A unit according to the present invention was compared to a commercial helical freezer that did not employ impingement, in freezing time and dehydration (moisture retention).

Cooked chicken breast fillets entering at 180° F. were used. The device of the present invention was operated at four temperatures: −130° F., −80° F., −48° F. and −35° F. The comparative device was operated at −130° F. and at −80° F. In all cases nitrogen was used as the refrigerant, and the devices were operated so that the product exited the devices at 0° F.

For the dehydration analysis the product was initially sealed in cooking bags and steam heated. The bags were then placed in a water bath briefly, to assure that they were equilibrated at 180° F. (This is a reheating step that results in additional moisture loss, so the following results would if anything understate the moisture retention enjoyed by the present invention.)

In each test, half of the samples were transferred to clean bags and allowed to cool. The other half of the samples were frozen in one of the devices. The dwell time reported in Table 1 was determined from baseline operation to provide the outlet product temperature of 0° F.

The percent moisture was then measured on both the inlet and outlet samples using a CEM AVC-80 Moisture/Solids Analyzer. The results were obtained-as an average of 12 data points (4 samples each tested 3 times). A mass balance calculation on the freezing process using the total solids information from the analyzer provides the yield loss in the freezing process.

The results, which appear in Table 1, show a faster freezing time (shorter dwell time) for the device of the present invention. The results in Table 1 also show that the present invention provides significantly higher moisture retention, which means that it provides a product having a higher perceived quality.

TABLE 1

| Operating temp, ° F. | Dwell time to 0° F. | | Moisture loss, wt. % | |
| --- | --- | --- | --- | --- |
| | Invention | Comparative device | Invention | Comparative device |
| −130° F. | 11 min | 20 min | 0.75% | 3.3% |
| −80° F. | 16 min | 34 min | 0.88% | 4.6% |
| −48° F. | 27 min | — | 0.89% | — |
| −35° F. | 32 min | — | 1.30% | —. |

What is claimed is:

1. A device useful for effecting heat transfer between objects and a gaseous heat transfer medium, comprising
   (A) an insulated housing;
   (B) an endless movable belt for carrying objects, that follows within said housing a path at least a portion of which is helical that defines a space bounded above and below by said belt and through which a gaseous heat transfer medium can flow toward or away from the axis of the helical path;
   (C) structure for supporting said belt and permitting it to move in said path,
   (D) means for driving said belt in said path;
   (E) a source of gaseous heat transfer medium at a temperature higher or lower than the temperature of said objects;
   (F) a distributor located within said space having at least one slot therethrough extending transverse to the direction of motion of said belt, the slot having a mouth for receiving said heat transfer medium from said space and a discharging orifice for discharging said heat transfer medium into said space toward a surface of the belt under the influence of impeller (G),
   (G) an impeller for circulating said heat transfer medium, and
   (H) structure defining a pathway for said heat transfer medium to flow under the influence of impeller (G) from said source into said space, from said space into, through and out of said at least one slot toward a surface of the belt, and then out of said space.

2. A device according to claim 1 wherein said source is a cooler.

3. A device according to claim 1 wherein said source comprises a dispenser that dispenses cryogen into the interior of said housing, and a line that feeds cryogen to said dispenser.

4. A device according to claim 1 wherein said source is a heater.

5. A device according to claim 1 wherein said source is a line that feeds steam into said housing.

6. A device according to claim 1 wherein said source is a steam generator.

7. A device according to claim 1 wherein said means for driving said belt comprises a cylindrical cage, located within the helix formed by the helical portion of said belt, which frictionally engages at its outer surfaces the inner edge of the belt.

8. A device according to claim 1 wherein said structure (C) includes one or more transverse support arms having a hollow interior and having therein a plurality of nozzles communicating with said hollow interior for ejecting gaseous heat transfer medium into said space.

9. A device according to claim 8 wherein said source (E) feeds cryogen into said hollow interior under sufficient pressure to eject said cryogen from said nozzles.

10. A device according to claim 8 wherein said source (E) feeds steam into said hollow interior under sufficient pressure to eject said steam from said nozzles.

11. A device according to claim 8 wherein said source is a cooler.

12. A device according to claim 8 wherein said source comprises a dispenser that dispenses cryogen into the interior of said housing, and a line that feeds cryogen to said dispenser.

13. A device according to claim 8 wherein said source is a heater.

14. A device according to claim 8 wherein said source is a line that feeds steam into said housing.

15. A device according to claim 8 wherein said source is a steam generator.

16. A device according to claim 8 wherein said means for driving said belt comprises a cylindrical cage, located within the helix formed by the helical portion of said belt, which frictionally engages at its outer surfaces the inner edge of the belt.

17. A device useful for effecting heat transfer between objects and a gaseous heat transfer medium, comprising
   (A) an insulated housing;
   (B) an endless movable belt for carrying objects, that follows within said housing a path at least a portion of which is helical that defines a space bounded above and below by said belt and through which a gaseous heat transfer medium can flow toward or away from the axis of the helical path;
   (C) structure for supporting said belt and permitting it to move in said path,
   (D) means for driving said belt in said path;
   (E) a source of gaseous heat transfer medium at a temperature higher or lower than the temperature of said objects;
   (F) a first distributor located within said space having at least one slot therethrough extending transverse to the direction of motion of said belt, and a second distributor located within said space having at least one slot therethrough extending transverse to the direction of motion of said belt, there being a region in said space between said first and second distributors, the slot in said first distributor having a mouth for receiving said heat transfer medium from said region and a discharging orifice for discharging said heat transfer medium under the influence of impeller (G) toward a surface of the belt above said discharge orifice,
   the slot in said second distributor having a mouth for receiving said heat transfer medium from said region and a discharging orifice for discharging said heat transfer medium under the influence of impeller (G) toward a surface of the belt below said discharge orifice,
   (G) an impeller for circulating said heat transfer medium, and
   (H) structure defining a pathway for said heat transfer medium to flow under the influence of impeller (G) into said region, from said region into, through and out of said at least one slot in said first and second distributors toward surfaces of the belt above and below said distributors, and then out of said space.

18. A device according to claim 17 wherein said source is a cooler.

19. A device according to claim 17 wherein said source comprises a dispenser that dispenses cryogen into the interior of said housing, and a line that feeds cryogen to said dispenser.

20. A device according to claim 17 wherein said source is a heater.

21. A device according to claim 17 wherein said source is a line that feeds steam into said housing.

22. A device according to claim 17 wherein said source is a steam generator.

23. A device according to claim 17 wherein said means for driving said belt comprises a cylindrical cage, located within the helix formed by the helical portion of said belt, which frictionally engages at its outer surfaces the inner edge of the belt.

24. A device according to claim 17 wherein said structure (C) includes one or more transverse support arms having a hollow interior and having therein a plurality of nozzles communicating with said hollow interior for ejecting gaseous heat transfer medium into said space.

25. A device according to claim 24 wherein said source (E) feeds cryogen into said hollow interior under sufficient pressure to eject said cryogen from said nozzles.

26. A device according to claim 24 wherein said source (E) feeds steam into said hollow interior under sufficient pressure to eject said steam from said nozzles.

27. A device according to claim 24 wherein said source is a cooler.

28. A device according to claim 24 wherein said source comprises a dispenser that dispenses cryogen into the interior of said housing, and a line that feeds cryogen to said dispenser.

29. A device according to claim 24 wherein said source is a heater.

30. A device according to claim 24 wherein said source is a line that feeds steam into said housing.

31. A device according to claim 24 wherein said source is a steam generator.

32. A device according to claim 24 wherein said means for driving said belt comprises a cylindrical cage, located within the helix formed by the helical portion of said belt, which frictionally engages at its outer surfaces the inner edge of the belt.

* * * * *